United States Patent [19]

Fujii et al.

[11] Patent Number: 5,103,596
[45] Date of Patent: Apr. 14, 1992

[54] METHOD AND APPARATUS FOR CONTROLLING CYLINDER GRINDING MACHINES

[75] Inventors: Shigeharu Fujii, Numazu; Yuji Washio, Kannami; Shigeyoshi Kuroda, Mishima, all of Japan

[73] Assignee: Toshiba Kikai Kabushiki Kaisha, Tokyo, Japan

[21] Appl. No.: 609,426

[22] Filed: Nov. 5, 1990

[51] Int. Cl.⁵ ............................................. B24B 49/00
[52] U.S. Cl. ......................... 51/165.76; 51/165.77; 51/165.78; 51/289 R
[58] Field of Search .......... 51/165.71, 165.76, 165.77, 51/165.78, 165.8, 165.83, 103 R, 103 C, 238 R, 238 S, 239

[56] References Cited

U.S. PATENT DOCUMENTS 3,967,414 7/1976 Tamesui et al. .................. 51/165.77
4,711,054 12/1987 Tsujiuchi et al. ................. 51/165.77

FOREIGN PATENT DOCUMENTS

2010144 6/1979 United Kingdom ............. 51/165.77

Primary Examiner—M. Rachuba
Attorney, Agent, or Firm—Koda and Androlia

[57] ABSTRACT

In a cylinder grinding machine including grinder supporting table which rotatably supports a grinder for grinding a cylindrical workpiece, a mechanism for feeding the grinder supporting table toward the cylindrical workpiece and a device for relatively moving the workpiece and the grinder in their axial directions, there is provided a computer control apparatus. The control apparatus is constituted by a workpiece diameter measuring device, a central processing unit for calculating the diameter of the workpiece at respective positions along the axis of the workpiece and control means for controlling the amount of feed of the grinder supporting table such that diameter errors would be lesser than a permissible value.

3 Claims, 9 Drawing Sheets

METHOD AND APPARATUS FOR CONTROLLING CYLINDER GRINDING MACHINES

BACKGROUND OF THE INVENTION

This invention relates to a method and apparatus for controlling a cylinder grinding machine, more particularly a long and relatively small diameter cylinder.

In order to work a slender cylindrical workpiece at a high accuracy it is necessary to control the grinding machine such that an axis interconnecting a headstock and a tailstock which are used to rotatably support the both ends of the workpiece is parallel with the direction of movement of a grinder or the cylindrical workpiece. A deflection suppressing device provided with rest members engaging the cylindrical workpiece is provided at a position confronting a grinding wheel for the purpose of preventing the flexure of the intermediate portion of the cylindrical workpiece causing the flexure or a small vibration of the grinder.

Heretofore, the adjustments of the parallism of the axes and of the rest members of the deflection suppressing device have been made manually. In recent years, however, owing to the requirement for automating the grinding machine, the automation of the workpiece supporting device has been developed. For example, as disclosed in Japanese Laid Open Patent Specification No. 5761/1987, a grinding machine has been proposed including a workpiece supporting device having a dimension measuring device which measures the diameter of the cylindrical workpiece so as to detect the contact condition of the rest members of the deflection suppressing device against the cylindrical workpiece.

As above described, in a prior art grinding machine equipped with a workpiece supporting device, a dimension measuring device has been provided for detecting the contact condition of the rest members of the deflection suppressing device against a cylindrical workpiece so as to prevent unsatisfactory supporting condition of the workpiece supporting device and to ensure accurate operation of the workpiece supporting device.

The longitudinal axis of the cylindrical workpiece tends to become not parallel with the direction of the movement of the cylindrical workpiece or the axis thereof caused by the deflection of the central portion, particularly of a cylindrical workpiece of a relatively small diameter, thereby decreasing the working accuracy, the deflection being caused by a pressure applied by the rest members.

SUMMARY OF THE INVENTION

It is an object of this invention to provide a novel control method and apparatus capable of accurately grinding a cylindrical workpiece by automatically controlling the feed quantity of the grinding wheel even when the cylindrical workpiece deflexes or when an axis interconnecting a headstock and a tailstock becomes not parallel with the axis of the grinding wheel or the direction of movement of the cylindrical workpiece.

Another object of this invention is to provide a novel method and apparatus for controlling a cylindrical member grinding machine capable of causing the rest members of a deflection suppressing device to engage the cylindrical workpiece under an optimum condition so as to accurately grinding a cylindrical workpiece without causing deflection and vibration of the workpiece at the time of grinding.

A further object of this invention is to provide a novel control method and apparatus of a cylindrical workpiece grinding machine capable of performing a correction grinding operation such that the diameter of the ground workpiece would be contained in a permissible range, thereby effecting grinding operation at a high accuracy.

Yet another object of this invention is to provide a control method and apparatus for controlling a grinding machine for grinding a slender cylindrical workpiece capable of preventing deflection of the workpiece.

According to one aspect of this invention there is provided a method of controlling a cylinder grinding machine including a grinder supporting table rotatably supporting a grinder for grinding a cylindrical workpiece, means for feeding the grinder supporting table in a direction perpendicular to an axis of the cylindical workpiece, and means for relatively moving the cylindical workpiece and the grinder .in their axial directions, characterized in that the method comprices the steps of measuring a diameter of the cylindrical workpiece, calculating diameters of the workpiece at respective positions along the axis of the workpiece in accordance with position signals at respective positions along the axis of the workpiece in accordance with position signal at respective axial positions of the workpiece and a diameter signal sent from diameter measuring means, controlling an amount of feed of the grinder supporting table such that diameter errors of the workpiece at the respective positions would be lesser than a permissible value, suppressing deflection of the workpiece, and adjusting an engaging force applied to the cylindrical workpiece.

According to another aspect of this invention there is provided control apparatus of a cylinder grinding machine, including a grinder supporting table rotatably supporting a grinder for grinding a cylindrical workpiece, means for feeding the grinder supporting table in a direction perpendicular to an axis of the cylindrical workpiece, and means for relatively moving the cylindrical workpiece and said grinder in their axial directions;

the control apparatus comprising:

means for measuring a diameter of the cylindrical workpiece;

the relatively moving means including means connected to the grinder feeding means, and to the diameter measuring means for calculating diameters of the workpiece at respective positions along the axis of the workpiece in accordance with position signals at respective positions along the axis of the workpiece in accordance with position signals sent from the relatively moving mans at respective axial positions of the workpiece and a diameter signal sent from the diameter measuring means, control means for controlling the relatively moving means and an amount of feed of the grinder supporting table such that diameter errors of said workpiece at the respective positions would be lesser than a permissible value, deflection suppressing means disposed on a side confronting the grinder supporting table and including engaging means engaging the cylindrical workpiece from both sides of the workpiece, and control means connected to the deflection suppressing means connected for adjusting an engaging force of the engaging means.

DESCRIPTION OF THE PREFERRED EMBODIMENTS

Figure 1:
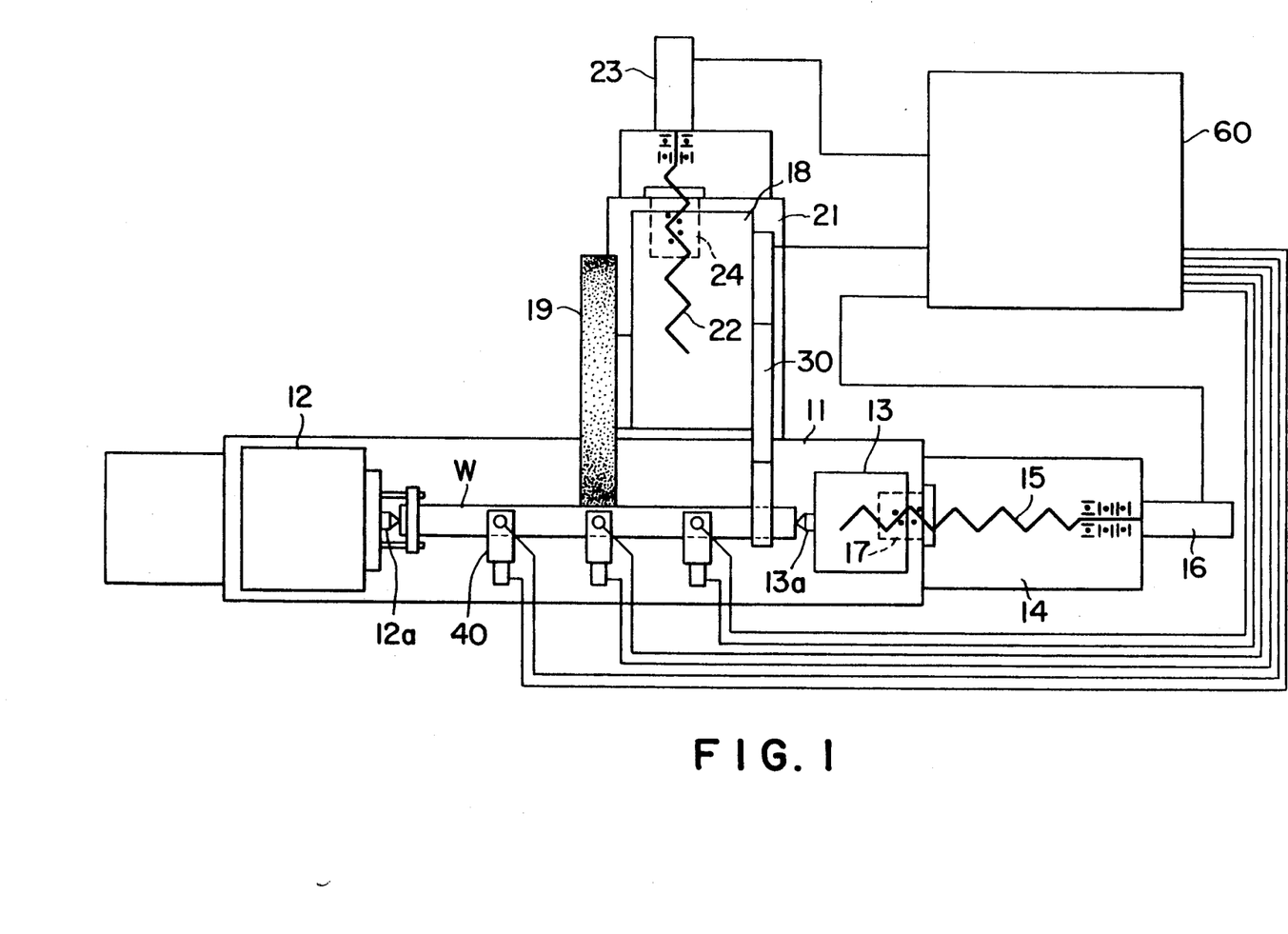
FIG. 1 is a diagrammatic side view, partly in blocks, showing a grinding tool and control apparatus thereof embodying the invention.

The grinding tool shown in FIG. 1 comprises a working table 11 on which are mounted a headstock 12 and a tailstock 13 which are provided for the purpose of rotatably supporting the opposite ends of a cylindrical workpiece W. The working table 11 is mounted on a bed 14 to be slidable thereon in a direction in parallel with an axis interconnecting the spindle 12a of the headstock 12 and the spindle 13a of the tailstock 13. Sliding of the working table 11 is effected by working table sliding means including a ball screw 15 mounted on bed 14, a servo-motor 16 for sliding the working table and adapted to rotate ball screw 15, and a nut 17 mating with ball screw.

A grinder 19 is rotatably supported by a table 18 which is mounted on a bed 21 so as to move the grinder 19 in a direction perpendicular to the axis of the cylindrical workpiece. Like the working table 11, grinder supporting table 18 is also moved by a ball screw 22, a grinder table feed servo-motor 23 for rotating ball screw 22 and a nut 24.

Figure 2:
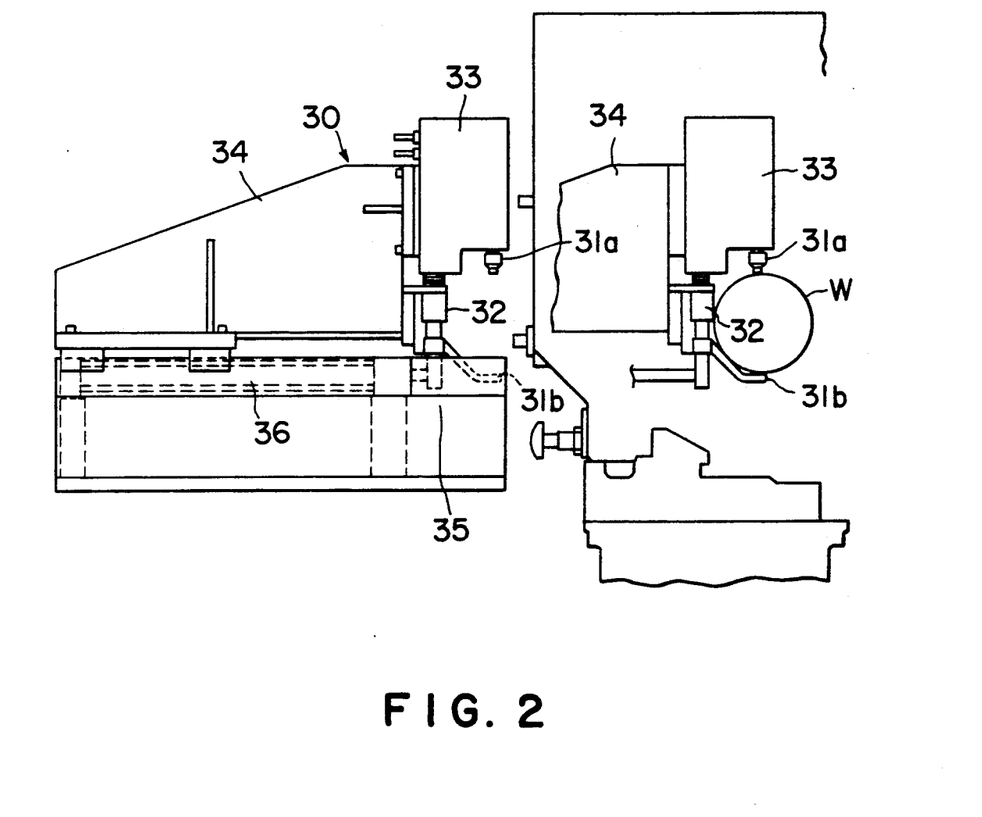
FIG. 2 is a side view showing one example of an automatic diameter measuring device.

A diameter measuring device 30 for measuring the diameter of the cylindrical workpiece W is located adjacent to the grinder table 18. As shown in FIG. 2, the diameter measuring device 30 is constituted by a measuring unit comprising an upper sensor 31a engaging the upper periphery of the cylindrical workpiece W and a lower sensor 31b contacting the lower periphery of the workpiece W, and a sensor driving unit for moving the lower sensor 31b in the vertical direction in accordance with the diameter of the workpiece W. The sensor driving unit is constituted by a piston 32 connected to the lower sensor and an actuator 33 for driving piston 32 in the vertical direction.

The measuring unit and the sensor driving unit are supported by a supporting unit 34 which is slidably mounted on a supporting base 35 disposed close to the grinder table 18, the supporting unit 34 being slidable in a direction perpendicular to the axis of the cylindrical workpiece W. An oil pressure cylinder 36 is provided for reciprocating supporting frame 34.

Figure 3:
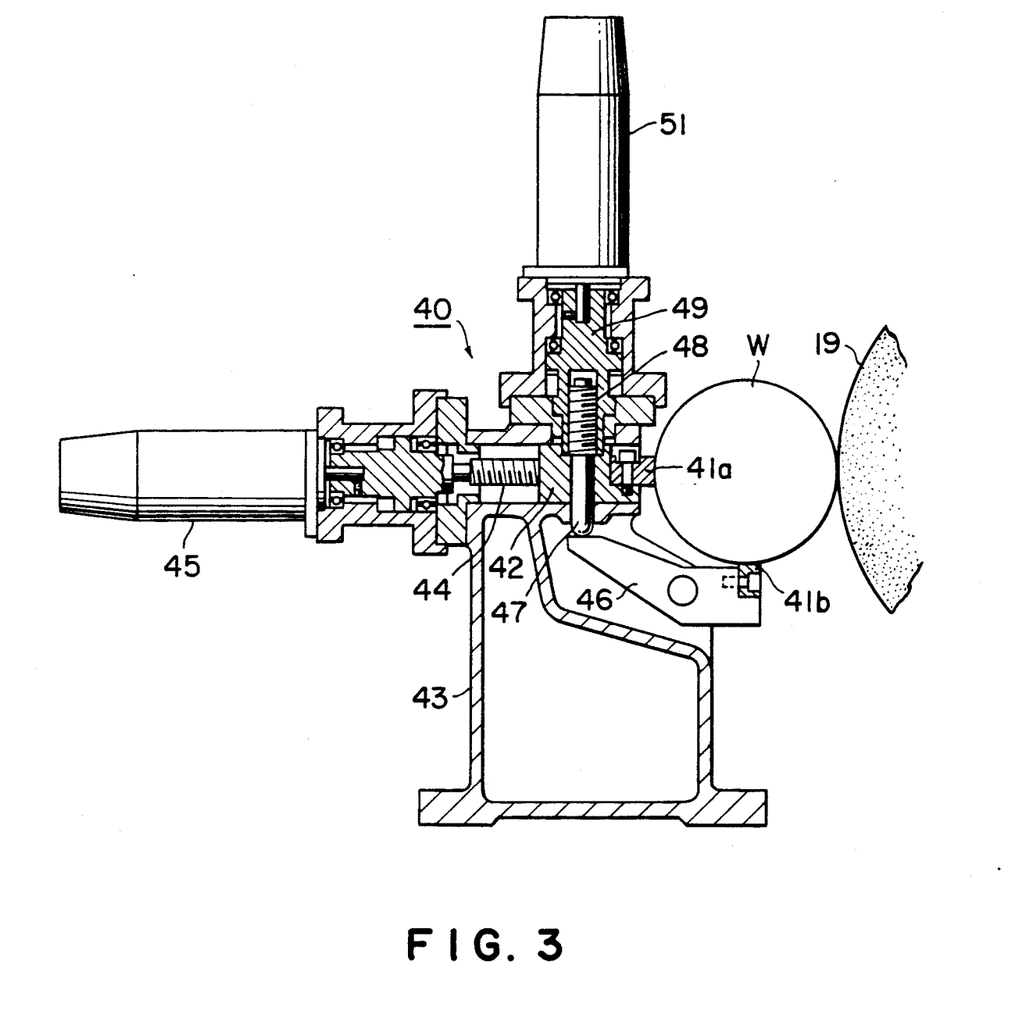
FIG. 3 is a side view, partly in section, showing one example of a deflection suppression device.

On both sides of the cylindrical workpiece W are provided the grinder table 18 and deflection suppressing device 40 including a number of rest members abutting the outer surface of the workpiece W. As shown in FIG. 3, the deflection suppressing device 40 comprises horizontal rest members 41a located on the opposite side of the grinder 19 with respect to the workpiece W and vertical rest members 41b engaging the lower peripheral surface of the workpiece W. Each one of the horizontal rest members 41a is secured to a slidable block 42 formed with a threaded opening, not shown. The slidable block 42 is supported by a supporting bracket 43 to be slidable in the horizontal direction and a threaded shaft 44 is threaded into the threaded opening. The threaded shaft 44 is driven by a horizontal torque motor 45. Each one of the vertical rest members 41b is mounted on one end of a swinging lever 46 supported by the supporting bracket 43 to be swingable in the vertical direction. The lower end of a vertical threaded shaft 47 engages the other end of the swinging lever 46 so as to swing the same in the vertical direction by the vertical motion of the threaded shaft 47. The upper end of the threaded shaft 47 is threaded into a threaded opening 48 of a rotatable block 49 which is driven by a vertical torque motor 51 and rotatably supported by the supporting bracket 43.

A plurality of deflection suppression devices 40 constructed as above described are disposed with a suitable spacing along the length of the cylindrical workpiece W.

The workpiece table driving motor 16, the grinder support driving motor 23, the actuator 33 of the diameter measuring device 30, the horizontal torque motor 45 and the vertical torque motor 51 of the deflection suppression device are controlled by a control apparatus 60, for example a computerized numerical control system (CNC).

Figure 4:
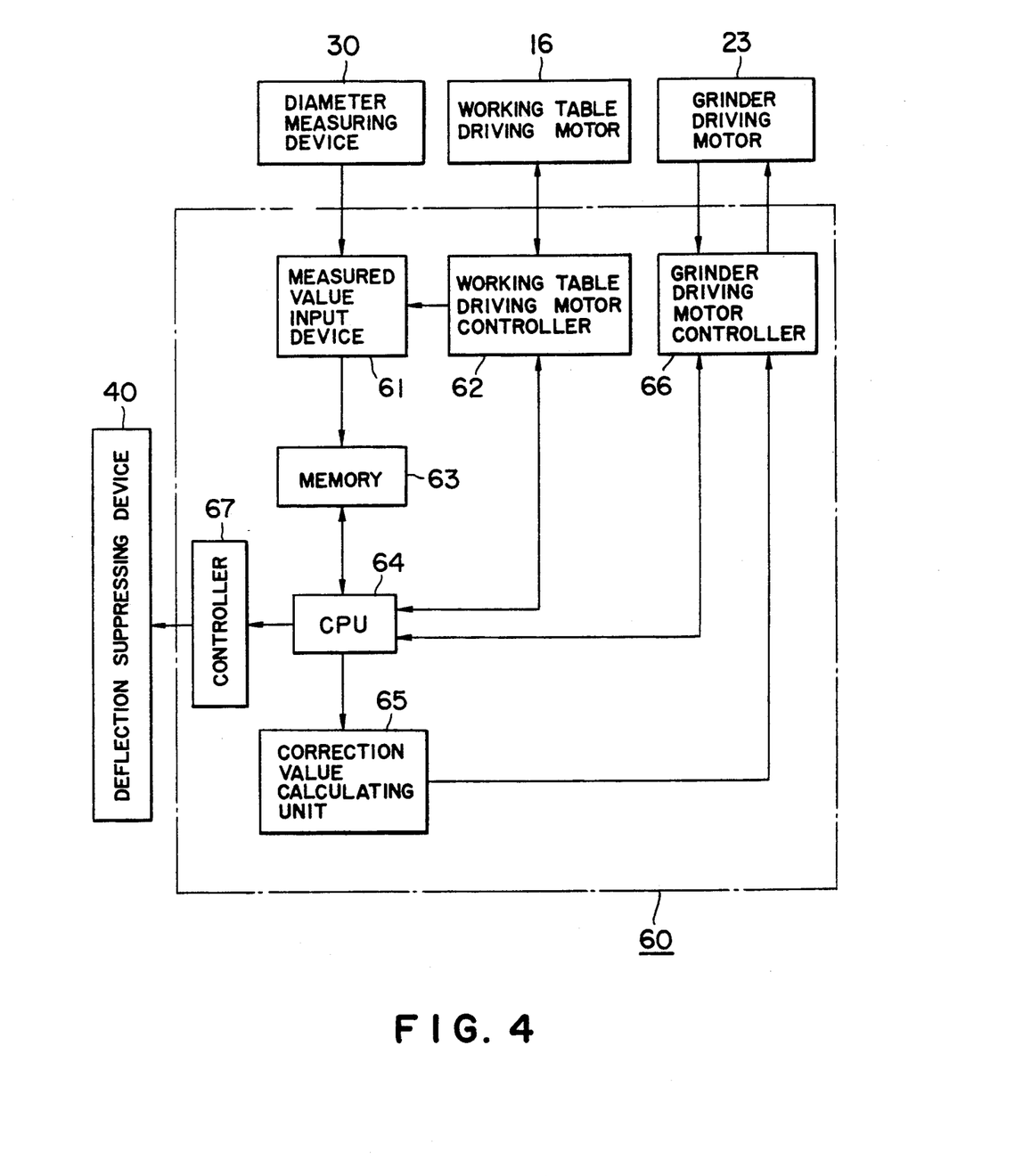
FIG. 4 is a block diagram showing the control apparatus of this invention.

The construction of the control apparatus 60 is shown by the block diagram shown in FIG. 4. As shown, the control apparatus 60 comprises a measured value input unit 61 inputted with the measured values of the diameter of the cylindrical workpiece W along its axial direction. The measured value input unit 61 is connected to the diameter measuring device 30 and the working table driving motor controller 62 of the working table driving motor 16. Thus, the measured value input unit 61 is inputted with the measured diameter value from the diameter measuring device 30 and a position signal representing the position of working table 11 from the working table driving motor controller 62, in other words, the position signal of the cylindrical workpiece W.

The measured diameter values along the axial direction of the workpiece W inputted to the measured value input unit 61 are stored in memory means 63.

The control apparatus 60 comprises a central processing unit (CPU) 64 which compares measured diameter values stored in the memory means 63 for judging as to whether the difference between the maximum and minimum diameters lies in a permissible range. There is also provided a correction value calculating unit 65 which calculates correction grinding quantities at respective axial positions of the workpiece W when the difference between the maximum and minimum values of the workpiece diameter is on the outside of the permissible range.

The correction value calculating unit 65 is connected to a grinder driving motor controller 66 controlling the grinder driving motor 23 for supplying to this motor a control signal so as to cause the grinder driving motor to effect a desired correction grinding operation.

The control apparatus further comprises a controller 67 connected to CPU 64 for controlling the contact pressure of the rest members 41a and 41b of the deflection suppressing device 40.

Figure 5:
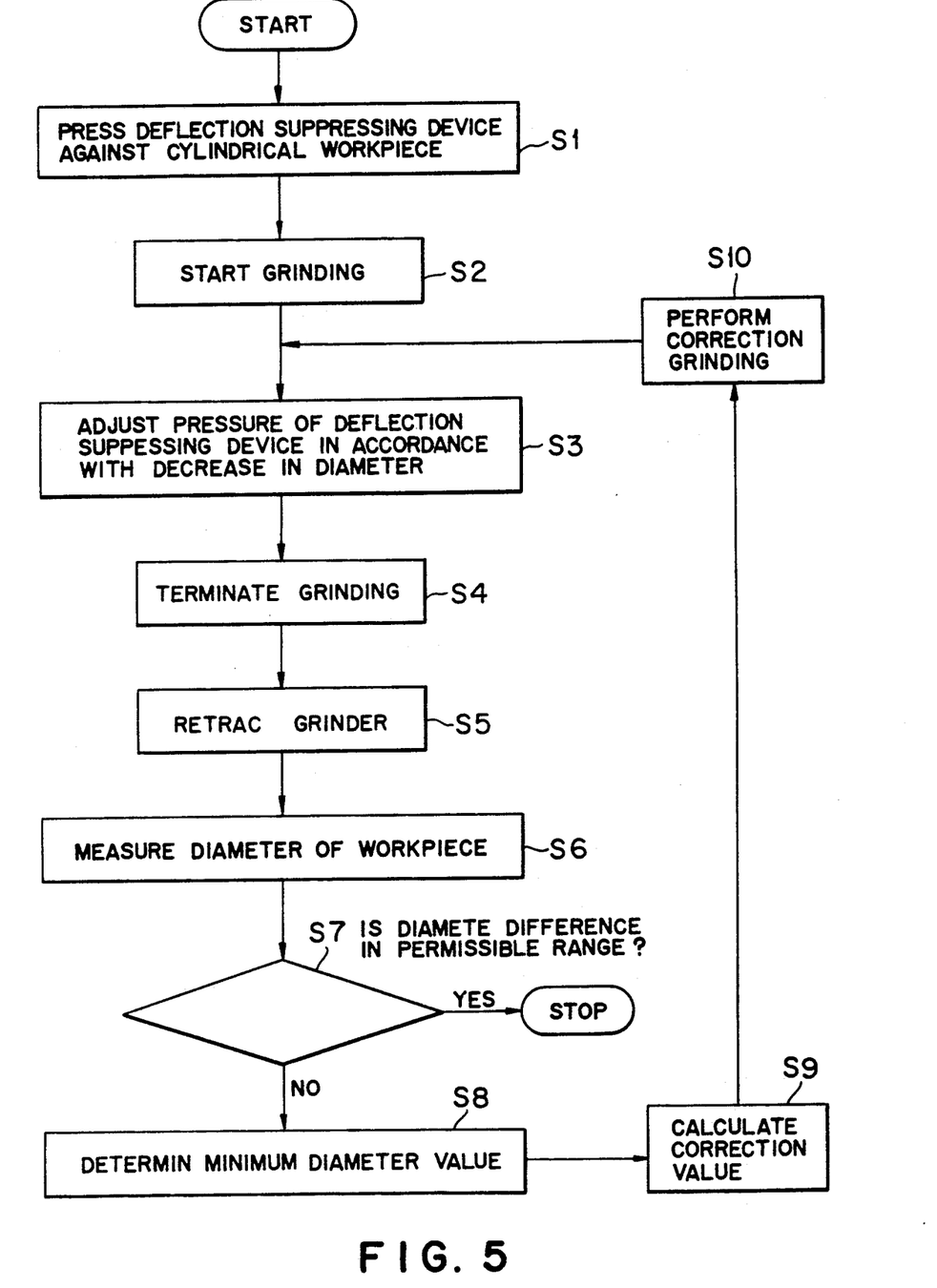
FIG. 5 is a flow chart showing the grinding steps of the grinding tool.

The operation of the control apparatus 60 will now be described with reference to a flow chart shown in FIG. 5. When an operating switch, not shown, of the cylinder grinding machine is turned ON, the horizontal torque motor 45 and the vertical torque motor 51 of the deflection suppressing device 40 are energized for urging the horizontal rest member 41a and the vertical rest member 41b against the cylindrical workpiece W at a constant pressure, at step S1. Then at step S2, the grinding operation is commenced while the deflection of the workpiece W is being suppressed and the grinder 10 is being rotated. During the grinding operation, the diameter of the cylindrical workpiece W decreases gradually, so that it is necessary to adjust the pressure of the rest members 41a and 41b for maintaining the contact pressure at a constant value (step 3). According to one method of adjusting the contact pressure of the rest members 41a and 41b, the horizontal and vertical torque motors 45 and 51 are controlled until the torque of these torque motors reach preset values. Where a plurality of rest members 41a and 41b are provided along the axial direction of the workpiece W the contact pressure of the rest members 41a and 41b are sequentially adjusted in accordance with the axial position of the grinder 19 for maintaining the contact pressure at a constant value.

The grinding operation is performed starting from a coarse grinding to a fine or finishing grinding and terminated at step 4. Upon completion of the grinding operation, the grinder 19 is retracted from the workpiece at step S5. Then the oil pressure cylinder 36 of the diameter measuring device 30 is actuated for moving the supporting frame 34 toward the cylindrical workpiece W so as to cause the upper and lower sensors 31a and 31b to clamp therebetween the workpiece W. The diameter of the workpiece W can be measured (at step S6) by the amount of movement of the actuator 33 necessary to move the upper and lower sensors 31a and 31b until these sensors contact against the upper and lower periphery of the workpiece W. The diameter measurement is done at many points along the axis of the workpiece W while the working table 11 and the diameter measuring device 30 are relatively moved in the axial direction and the measured diameter values at respective points are stored in memory means 63.

The measured diameter values stored in the memory means 63 are compared with each other in CPU 64 and a judgment is made at step S7 as to whether the difference between the maximum and minimum diameters lies in a permissible range. Where the difference between diameters is not in the permissible range, a cylinder of a desired diameter cannot be obtained, which means that a correction of grinding is necessary.

In this case, measured diameters at respective points are compared with each other to obtain the minimum diameter $D_{min}$ at step S8. Then at step S9, grinding correction values at respective axial points are calculated by the correction value calculating unit 65. The calculation of these correction values is made by using the following equation $$a_n = \frac{D_n - D_{min}}{2}$$

where
$a_n$: grinding correction value,
$D_n$: diameter at a position n in the axial direction.

The calculated correction value is sent to the grinder driving motor controller 66 for correcting the grinding operation while moving in the axial direction the grinder 19 by driving motor 23, at step S10.

After correcting the grinding operation the diameter is measured again. When the diameter difference is decreased to be in the permissible range, the grinding cycle is terminated.

As above described, according to this embodiment, diameter measuring device 30 is provided so as to measure the diameter of the ground workpiece at various points in the axial direction of the cylindrical workpiece and to effect the correction grinding such that the diameter difference would decrease to be in the permissible range. For this reason, even when the axis of the workpiece W and axial direction of movement of the grinding wheel or of the workpiece are not parallel caused by insufficient contact, that is eccentric supporting of the workpiece by the headstock and tailstock, accurately ground cylinders can be obtained.

Since it is possible to move and adjust the rest members 41a and 41b of the deflection suppressing device during the grinding operation in accordance with the feed quantity of the grinder 19, it is possible to always press the rest members 41a and 41b against the workpiece W at a constant pressure, thus efficiently preventing small vibration during the grinding operation.

In the foregoing embodiment, the grinder table 18 was held stationary with respect to the axial direction of the workpiece W and the workpiece was moved in the axial direction by the movement of the working table 11. However, it is possible to hold the workpiece not to move in the axial direction and to move the grinder table 18 in the axial direction. In such modification, the working table 11 and the working table driving motor 16 are not necessary and it is only necessary to move the grinder table 18 in parallel with the axis of the cylindrical workpiece W.

Although a specific construction of the diameter measuring device was shown in FIG. 2, any construction can be used so long as it can measure the diameter of the cylindrical workpiece at various positions in the axial direction thereof.

Figure 6:
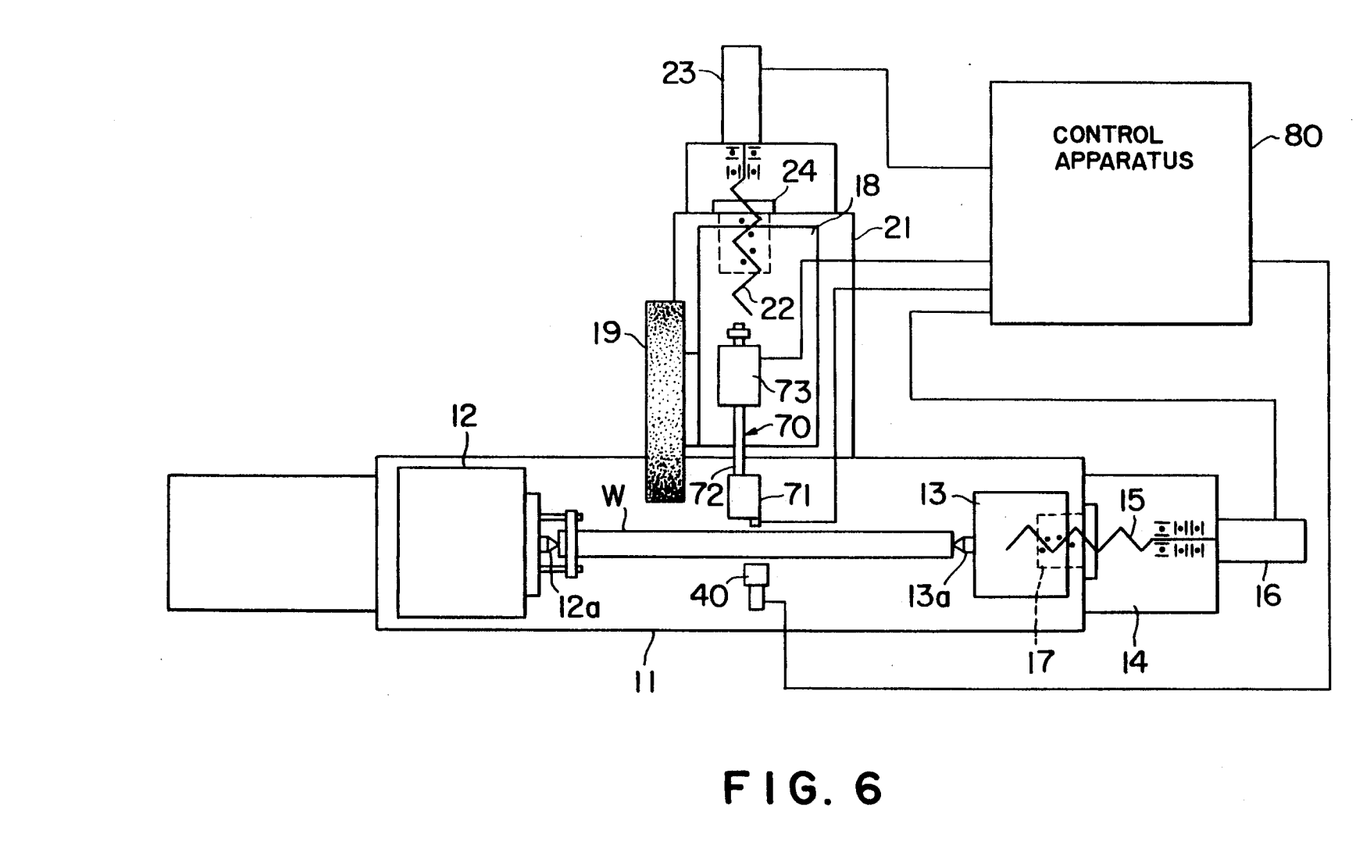
FIG. 6 is a side view similar to FIG. 1 showing another embodiment of this invention.
Figure 7:
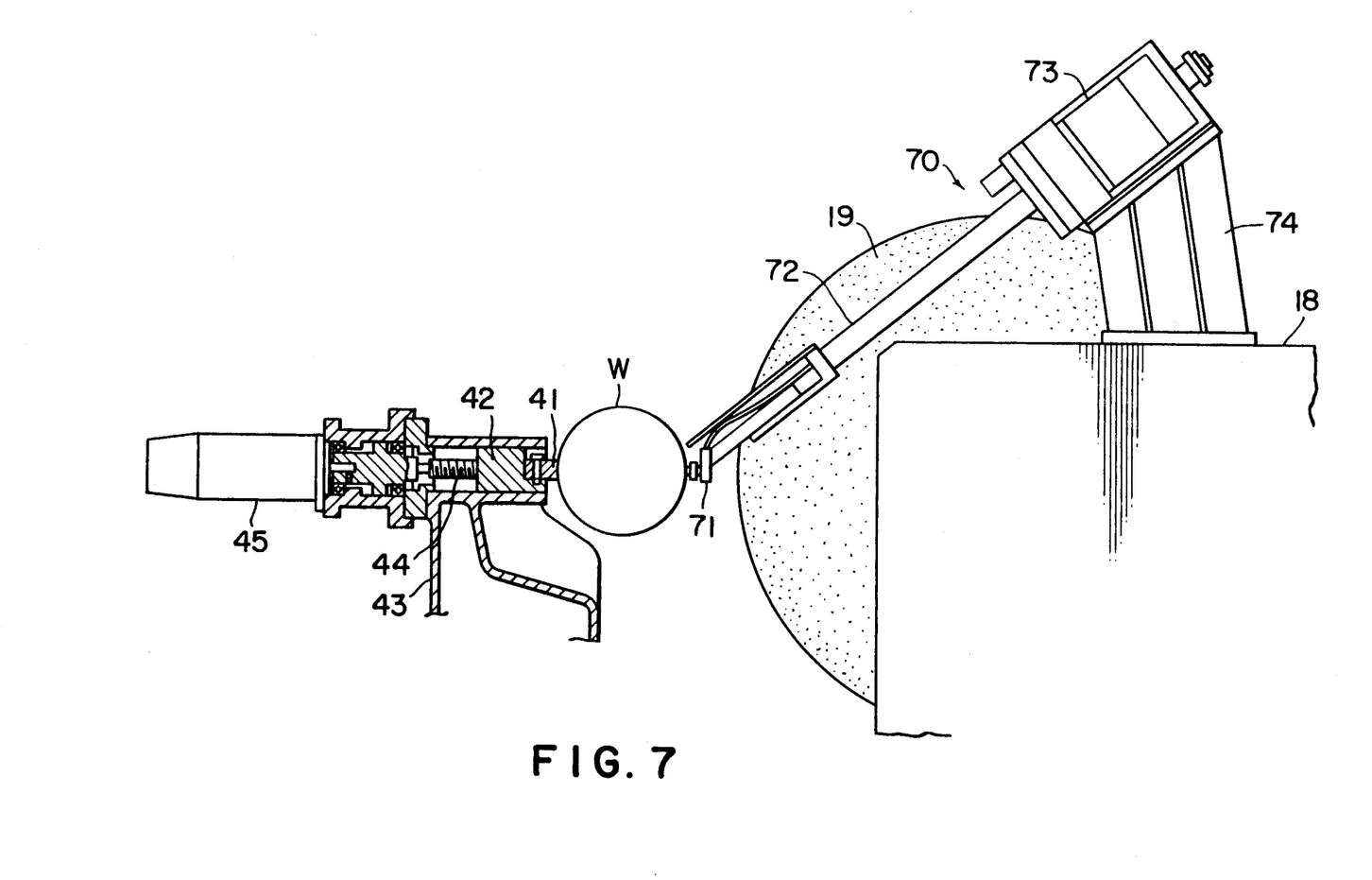
FIG. 7 is a partial sectional view showing the operations of the automatic deflection suppressing device and a touch sensor.
Figure 8:
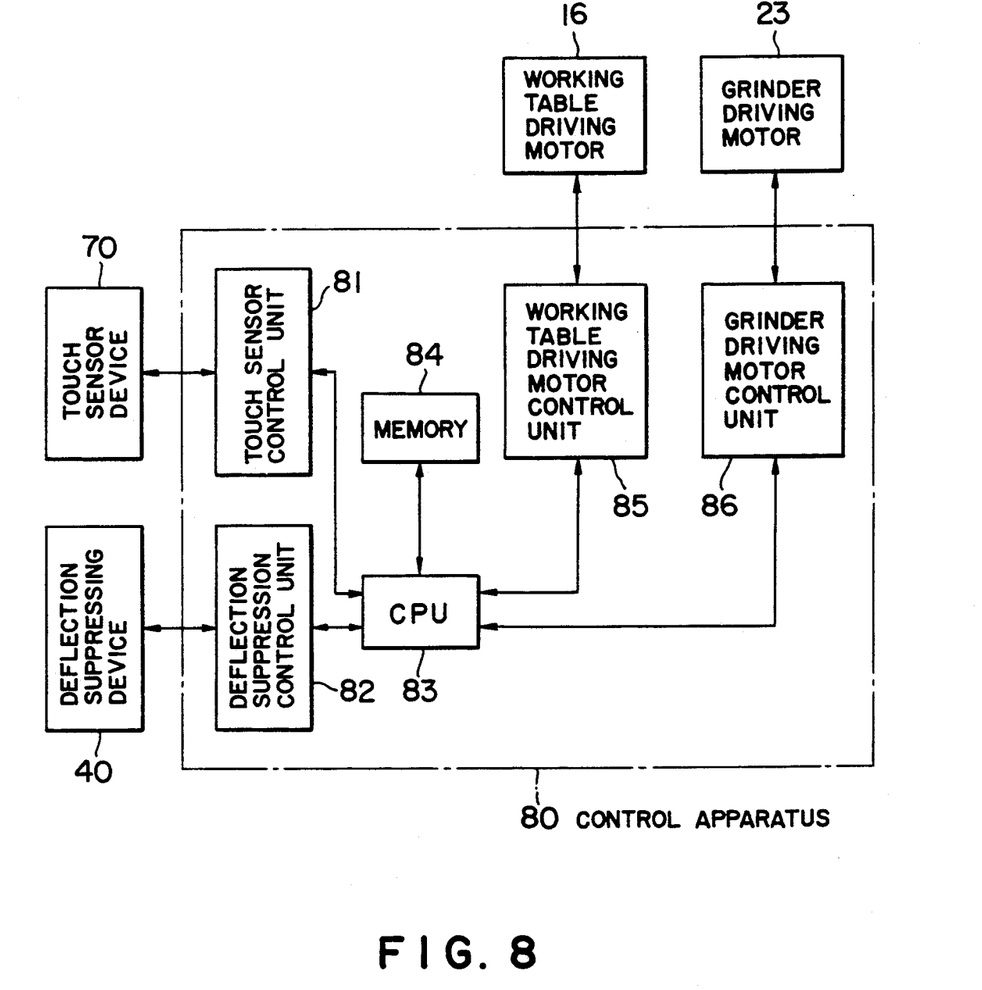
FIG. 8 is a block diagram showing a modification of the control apparatus of this invention.

FIGS. 6-8 show another embodiment of this invention. In these figures, reference numerals represent the same elements shown in the first embodiment.

In this modification, a touch sensor 70 is provided for detecting contact of the horizontal rest member 41a (see FIG. 3) of the deflection suppressing device 40 against the cylindrical workpiece W. More particularly, as shown in FIG. 7, the touch sensor device 70 comprises a touch sensor 71 which contacts against the periphery of the workpiece W on a side opposite the side at which the horizontal rest member 41a contacts the periphery of the workpiece. The touch sensor 71 supported by the tip of a rod shaped supporting frame 72 and a servomotor 73 is connected to the other end of the supporting frame 72 for moving the touch sensor. The purpose of servo-motor 73 is to move the supporting frame in the longitudinal direction and is mounted on an inclined upper support 74 on the grinder table 18.

In this modified embodiment, the deflection suppressing device 40 is provided at the axial center of the cylindrical workpiece W.

The working table driving motor 16, grinder driving motor 23, the touch sensor 71 servo-motor 73, and servo-motors 45, 51 of the deflection suppressing device 40 are connected to a control apparatus, for example, a CNC 80.

As shown in the block diagram of FIG. 8, the control apparatus 80 comprises touch sensor control unit 81 controlling the servo-motor 73 of touch sensor device 70, and a deflection suppression control unit 82 controlling the feeding of rest members 42a and 41b of the vibration suppressing device 40. These control units 81 and 82 are connected to CPU 83 which is connected to the working table driving motor control unit 85 and the grinder driving motor control unit 86 in the same manner as in the first embodiment. The control apparatus 80 further comprises memory means 84 connected to CPU 83.

Figure 9:
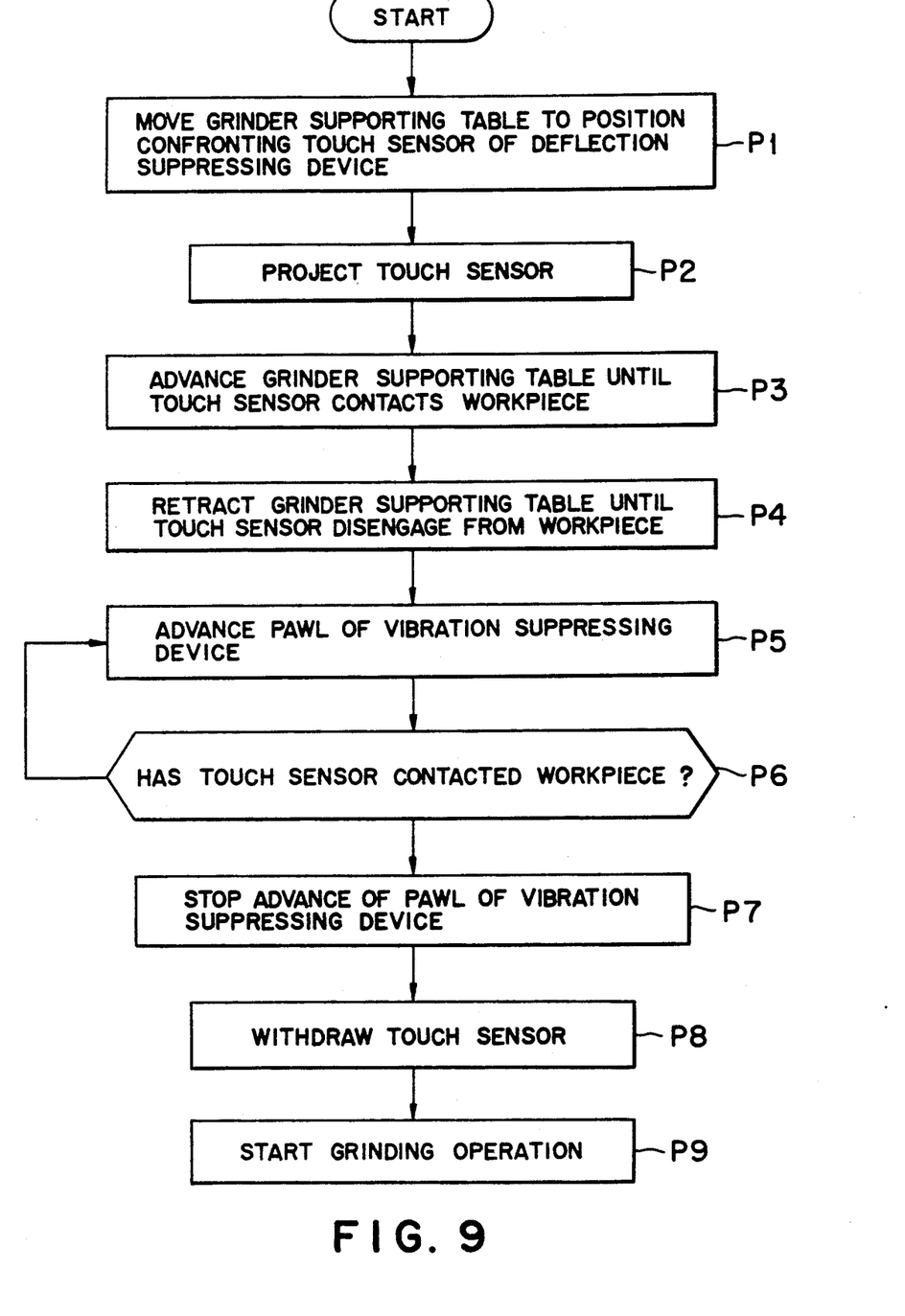
FIG. 9 is a flow chart showing the grinding steps of the grinding tool controlled by a modified control apparatus shown in FIG. 8.

The operation of this modified embodiment will now be described with reference to a flow chart shown in FIG. 9.

Upon closure of a source switch, not shown, of the cylinder grinding apparatus, the working table driving motor 16 is energized to move the working table 11 until touch sensor device 70 is brought to a position confronting the deflection suppressing device 40 (step P1). Then, the servo-motor 73 is energized to drive touch sensor device 70 for projecting supporting frame 72 so as to bring the touch sensor 71 to a position orthogonal to the axis of the workpiece W (step P2).

The grinder driving motor 23 is driven until the touch sensor 71 comes to contact with the workpiece W so as to advance the grinder table 18. Upon contact, the motor 23 is stopped at step P3. Then at step P4 the grinder driving motor 23 is energized for retracting the grinder table 18 until the touch sensor 71 disengages from the workpiece W. Upon disengagement, the grinder driving motor 23 is immediately stopped at step P4. Then at step P5, the horizontal torque motor 45 of the deflection suppressing device 40 is operated for advancing horizontal rest member 41a. After engaging rest members 41a and 41b against the cylindrical sensed by touch sensor 71. More particularly, at step P6 a judgment is made as to whether the touch sensor 71 (which is normally held not to contact with the workpiece) has touched against the workpiece W. As the workpiece W deflexes and contacts against touch sensor 71, at step P7, the movement of the horizontal rest member 41a is immediately stopped. Then at step P8, the servo-motor 73 of touch sensor 70 is actuated for withdrawing the touch sensor 71 away from the workpiece W.

As above described after engaging the horizontal rest member against the outer periphery of the workpiece W at an optimum condition and then rotating grinder 19, the grinding operation is commenced at step P9.

According to this modification, as it is possible to reduce the contact force of rest member 41a to substantially zero it becomes possible to cause the horizontal rest member 41a of the deflection suppressing device 40 to engage the outer periphery of the workpiece W under the optimum condition whereby it is possible to prevent small vibrations of the workpiece W during its grinding operation.

This modified embodiment is especially effective to grind a cylindrical workpiece having a relatively small diameter and a large length.

As above described, according to the control apparatus of this invention, as it is possible to effect correcting grinding such that the diameter of the ground workpiece will be in a permissible range, highly accurate grinding operation can be obtained.

Furthermore, as the rest members of the deflection suppressing device are urged against the workpiece at a constant pressure, generation of small vibrations during the grinding operation can be prevented.

As above described, according to this invention, it is possible to accurately grind a slender cylindrical workpiece.

What is claimed is:

1. Control apparatus of a cylinder grinding machine including:
   a grinder supporting table rotatably supporting a grinder for grinding a cylindrical workpiece;
   means for feeding said grinder supporting table in a direction perpendicular to an axis of said cylindrical workpiece; and
   means for relatively moving said cylindrical workpiece and said grinder in their axial directions;
   said control apparatus comprising:
   means for measuring a diameter of said cylindrical workpiece connected to;
   said relatively moving means including means connected to said grinder feeding means, said diameter measuring means for calculating diameters of said workpiece at respective positions along the axis of said workpiece in accordance with position signals sent from said relatively moving means at respective axial positions of said workpiece and a diameter signal sent from said diameter measuring means;
   control means for controlling the relatively moving means and an amount of feed of said grinder supporting table such that diameter errors of said workpiece at said respective positions would be lesser than a permissible value;
   deflection suppressing means disposed on a side confronting said grinder supporting table and including engaging means engaging said cylindrical workpiece from both sides of said workpiece;
   and control means connected to said deflection suppressing means for adjusting an engaging force of said engaging means.

2. The control apparatus according to claim 1 wherein said engaging means comprises a plurality of axially spaced rest members actuated by said control apparatus.

3. A method of controlling a cylinder grinding machine including a grinder supporting table rotatably supporting a grinder for grinding a cylindrical workpiece, means for feeding the grinder supporting table in a direction perpendicular to an axis of said cylindrical workpiece and said grinder in their axial directions, workpiece diameter measuring means including a touch sensor adapted to detect engagement of said workpiece diameter measuring means against a periphery of said cylindrical workpiece, and workpiece deflection suppression means including rest members adapted to engage the periphery of said cylindrical workpiece, at respective positions along the axis of said workpiece, said method comprising the steps of:

moving said grinder supporting table to a position at which said touch sensor confronts the periphery of said cylindrical workpiece;

projecting sad touch sensor toward said periphery;

advancing said grinder supporting table until said touch sensor contacts said workpiece;

retracting said grinder supporting table until said touch sensor disengages from said workpiece;

advancing said rest members of said workpiece deflection suppressing means for causing said rest members to support and slightly deflect said workpiece;

judging as to whether said touch sensor has come into contact or not;

stopping advancement of said rest members of said deflection suppressing means;

withdrawing said touch sensors;

starting a grinding operation;

stopping the grinding operation after predetermined operation;

measuring a diameter of said cylindrical workpiece;

calculating diameters of said workpiece at respective positions along an axis of said workpiece in accordance with position signals at respective positions and a diameter signal sent from said diameter measuring means; and controlling an amount of feed of said grinder supporting table such that the differences between the diameters of said workpiece which are measured at said respective positions would be lesser than a permissible value.

* * * * *